United States Patent
Ramirez Corredores et al.

(10) Patent No.: US 9,206,365 B2
(45) Date of Patent: *Dec. 8, 2015

(54) FUNGIBLE BIO-OIL

(75) Inventors: Maria Magdalena Ramirez Corredores, Houston, TX (US); Jennifer Sorrells, Houston, TX (US)

(73) Assignee: KiOR, LLC, Pasadena, TX (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/472,595

(22) Filed: May 16, 2012

(65) Prior Publication Data

US 2013/0174476 A1     Jul. 11, 2013

Related U.S. Application Data

(60) Provisional application No. 61/585,214, filed on Jan. 10, 2012.

(51) Int. Cl.
| | | |
|---|---|---|
| *C10G 1/00* | (2006.01) | |
| *C10G 3/00* | (2006.01) | |
| *C10L 1/02* | (2006.01) | |
| *C10L 1/19* | (2006.01) | |

(52) U.S. Cl.
CPC ... *C10L 1/02* (2013.01); *C10L 1/19* (2013.01); *C10L 2200/04* (2013.01); *C10L 2200/0461* (2013.01); *C10L 2200/0469* (2013.01); *C10L 2200/0476* (2013.01); *C10L 2290/02* (2013.01); *C10L 2290/12* (2013.01); *C10L 2290/24* (2013.01); *C10L 2290/28* (2013.01); *C10L 2290/52* (2013.01); *C10L 2290/54* (2013.01); *C10L 2290/547* (2013.01)

(58) Field of Classification Search
CPC ............... C10G 2300/1011; C10G 2300/1014; C10G 1/00; C10G 1/002
USPC .................................................. 585/240, 242
See application file for complete search history.

(56) References Cited

U.S. PATENT DOCUMENTS

| | | | |
|---|---|---|---|
| 4,942,269 A | 7/1990 | Chum et al. | |
| 5,820,640 A | 10/1998 | Ikura et al. | |
| 7,819,930 B2 | 10/2010 | Adams et al. | |
| 7,888,540 B2 | 2/2011 | Deluga et al. | |
| 7,905,990 B2 * | 3/2011 | Freel ............................... 201/12 |
| 8,022,259 B2 * | 9/2011 | Bauer et al. .................. 585/240 |
| 8,152,867 B2 * | 4/2012 | Dumenil ......................... 44/307 |
| 8,183,422 B2 * | 5/2012 | Alegria et al. ............... 585/240 |
| 8,277,643 B2 * | 10/2012 | Huber et al. ................. 208/400 |

(Continued)

FOREIGN PATENT DOCUMENTS

WO    WO2008020167    2/2008

OTHER PUBLICATIONS

J.P. Diebold, A Review of the Chemical and Physical Mechanisms of the Storage Stability of Fast Pyrolysis Bio-Oils, NREL Report 570-27613 (2000).

(Continued)

*Primary Examiner* — Ellen McAvoy
(74) *Attorney, Agent, or Firm* — Hovey Williams LLP (57) ABSTRACT

Fungible bio-oil compositions with enhanced processability are provided. A process to produce the fungible bio-oil composition is also provided that involves combining a biomass-derived liquid, at least one petroleum-derived composition, and, optionally, one or more additives in order to produce the fungible bio-oil composition.

36 Claims, 3 Drawing Sheets

(56) References Cited

U.S. PATENT DOCUMENTS

| | | | |
|---|---|---|---|
| 8,329,969 B2* | 12/2012 | McCall et al. | 585/240 |
| 8,377,152 B2* | 2/2013 | Ramirez Corredores et al. | 44/450 |
| 8,404,910 B2* | 3/2013 | Kocal et al. | 585/240 |
| 8,454,712 B2* | 6/2013 | Ramirez Corredores et al. | 44/450 |
| 8,492,600 B2* | 7/2013 | Marker et al. | 585/240 |
| 8,502,003 B2* | 8/2013 | Siskin et al. | 585/240 |
| 8,506,658 B2* | 8/2013 | Corredores et al. | 44/605 |
| 8,519,203 B2* | 8/2013 | Marinangeli et al. | 585/240 |
| 8,557,000 B2* | 10/2013 | Agaskar | 44/307 |
| 8,574,404 B1* | 11/2013 | Sinclair | 201/12 |
| 8,575,408 B2* | 11/2013 | Marker et al. | 585/240 |
| 8,647,398 B2* | 2/2014 | Ramirez Corredores et al. | 44/605 |
| 8,669,405 B2* | 3/2014 | Ramirez Corredores et al. | 585/240 |
| 8,822,745 B2* | 9/2014 | Fjare et al. | 585/240 |
| 8,951,308 B2* | 2/2015 | Ellis et al. | 44/500 |
| 2009/0250376 A1 | 10/2009 | Brandvold et al. | |
| 2010/0002792 A1 | 1/2010 | Seyedi-Esfahani | |
| 2011/0138681 A1 | 6/2011 | Ramariz Corredores et al. | |
| 2011/0139602 A1 | 6/2011 | Lin et al. | |
| 2011/0144396 A1* | 6/2011 | Lotero et al. | 585/240 |
| 2012/0108860 A1* | 5/2012 | Daugaard et al. | 585/14 |
| 2013/0030228 A1* | 1/2013 | Chen | 585/240 |
| 2013/0030230 A1* | 1/2013 | Brandvold et al. | 585/242 |
| 2013/0055627 A1* | 3/2013 | Vanderspurt et al. | 44/438 |
| 2013/0109894 A1* | 5/2013 | Trewella | 585/25 |
| 2013/0134351 A1* | 5/2013 | Bathurst | 252/183.13 |
| 2013/0144089 A1* | 6/2013 | Fjare et al. | 585/16 |
| 2013/0167603 A1* | 7/2013 | Bathurst et al. | 71/23 |
| 2013/0178672 A1* | 7/2013 | Chen et al. | 585/240 |
| 2013/0212930 A1* | 8/2013 | Naae et al. | 44/307 |
| 2014/0100396 A1* | 4/2014 | DeSisto et al. | 585/242 |
| 2014/0371496 A1* | 12/2014 | Stevens et al. | 585/240 |

OTHER PUBLICATIONS

A.V. Bridgwater, G.V.C. Peacocke, Fast Pyrolysis Processes for Biomass, Renewable and Sustainable Energy Reviews, vol. 4, pp. 1-73 (2000).

M. Garcia-Perez, J. Shen, X.S. Wan, and C.F.Li, Production and Fuel Properties of Fast Pyrolysis Oil/Bio-Diesel Blends, Fuel Processing Technology, 91(3), pp. 296-305 (2010).

* cited by examiner

FUNGIBLE BIO-OIL

CROSS-REFERENCE TO RELATED APPLICATIONS

This application claims benefit under 35 U.S.C. §119(e) based on U.S. Provisional Application No. 61/585,214, filed on Jan. 10, 2012, the entire disclosure of which is incorporated herein by reference.

FIELD OF THE INVENTION

The present invention relates generally to fungible bio-oil compositions with enhanced processability and to processes for making such fungible bio-oils.

BACKGROUND OF THE INVENTION

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. One of the useful products that may be derived from biomass is a liquid product commonly referred to as "bio-oil."

Bio-oil may be processed into transportation fuels, hydrocarbon chemicals, and/or specialty chemicals. However, most bio-oils that are produced contain high amounts of oxygenated molecules. Due to these high oxygen contents, the bio-oils can be immiscible or incompatible with conventional refinery streams, thereby inhibiting their ability to be processed and refined in conventional refineries. In an attempt to remedy this problem, highly-oxygenated bio-oils have been subjected to various upgrading processes, such as hydrotreatment, in order to lower their oxygen contents. Although these deoxygenated bio-oils may show improved miscibility with conventional refinery streams, such upgrading process can be expensive and not cost-effective.

Accordingly, there is a need for an improved process for making a bio-oil composition that is more miscible with conventional refinery streams.

SUMMARY OF INVENTION

In one embodiment of the present invention, a process for producing a fungible bio-oil is provided. The process comprises combining a bio-oil having an oxygen content of not more than 15 weight percent with a petroleum-derived composition to produce the fungible bio-oil, wherein the weight ratio of bio-oil to the petroleum-derived composition in the fungible bio-oil is at least 1:1 and not more than 20:1.

In another embodiment of the present invention, a process for producing a fungible bio-oil is provided. The process comprises the steps of: (a) combining a bio-oil and a non-polar extractant to produce a mixture, wherein the extractant causes the formation of an insoluble residue in the mixture; and (b) removing at least a portion of the insoluble residue from the mixture to thereby produce a fungible bio-oil and a removed residue.

In yet another embodiment of the present invention, a fungible bio-oil is provided that comprises biomass-derived components and petroleum-derived components. In such an embodiment, the weight ratio of the biomass-derived components to the petroleum-derived components is at least 1:1 and not more than 20:1. Furthermore, the fungible bio-oil has an organic oxygen content of not more than 15 weight percent.

In still yet another embodiment of the present invention, a fungible bio-oil is provided that comprises biomass-derived components, petroleum-derived components, and at least 0.5 and not more than 25 weight percent of one or more additives. The additives comprise a carboxylate, a benzoate ester, a fatty acid methyl ester (FAME), an alkoxylate, and mixtures thereof. Furthermore, the weight ratio of the biomass-derived components to the petroleum-derived components is at least 0.01:1 and not more than 10:1.

BRIEF DESCRIPTION OF THE FIGURES

Embodiments of the present invention are described in detail below with reference to the attached figure, wherein.

DETAILED DESCRIPTION

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The present invention relates to the production of a fungible bio-oil that is readily miscible with conventional refinery streams. The present invention focuses on the combination of a bio-oil with at least one petroleum-derived composition to produce the fungible bio-oil. In certain embodiments of the present invention, a process for producing a fungible bio-oil is provided that comprises blending an initial bio-oil with at least one petroleum-derived composition and, optionally, one or more additives to produce the fungible bio-oil. In such embodiments, it is the objective of the process to dilute many of the undesirable reactive species in the initial bio-oil, thereby mitigating the negative effects these reactive species cause on transporting and processing the bio-oil in conventional refineries.

Figure 1:
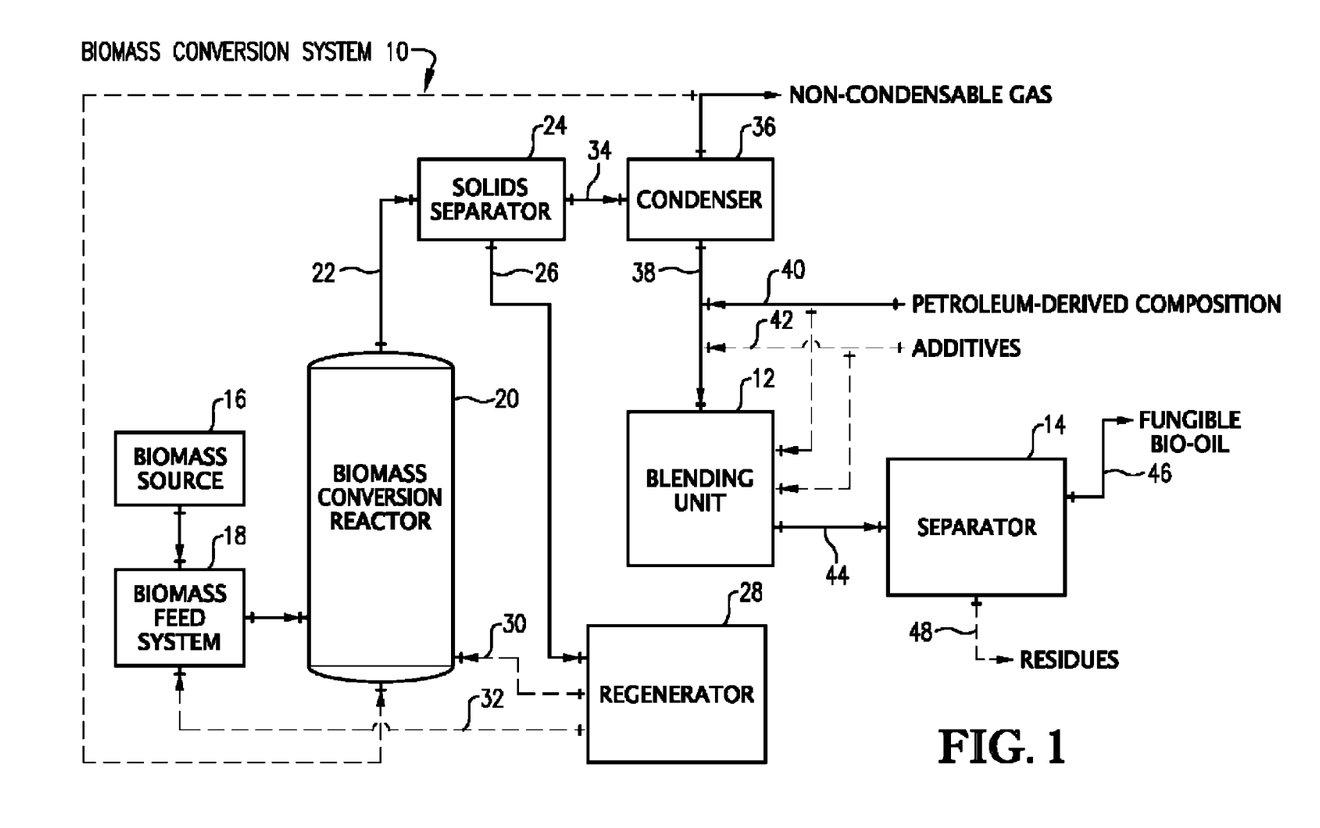
FIG. 1 is a schematic diagram of a biomass conversion system according to one embodiment of the present invention.

FIG. 1 depicts an exemplary embodiment of a biomass conversion system 10 suitable for producing the fungible bio-oil composition of the present invention. The biomass conversion system 10 of FIG. 1 can include a blending unit 12 and a separator 14 for producing the fungible bio-oil. It should be understood that the biomass conversion system 10 shown in FIG. 1 is just one example of a system within which the present invention can be embodied. The present invention may find application in a wide variety of other systems where it is desirable to efficiently and effectively produce bio-oil, upgrade bio-oil, and/or produce a number of useful products from the byproducts of biomass conversion. The exemplary biomass conversion system 10 illustrated in FIG. 1 will now be described in more detail.

The biomass conversion system 10 of FIG. 1 includes a biomass source 16 for supplying a biomass feedstock to the system. The biomass source 16 can be, for example, a hopper, storage bin, railcar, over-the-road trailer, or any other device that may hold or store biomass. The biomass supplied by the biomass source 16 can be in the form of solid particles. In one embodiment, the biomass particles can be fibrous biomass materials comprising cellulose. Examples of suitable cellulose-containing materials include algae, paper waste, and/or cotton linters. In another embodiment, the biomass particles can comprise a lignocellulosic material. Examples of suitable lignocellulosic materials include forestry waste such as wood particles, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 16 can be supplied to a biomass feed system 18. The biomass feed system 18 can be any system capable of feeding solid particulate biomass to a biomass conversion reactor 20. While in the biomass feed system 18, the biomass material may undergo a number of pretreatments to facilitate the subsequent conversion reactions. Such pretreatments may include drying, roasting, torrefaction, demineralization, steam explosion, mechanical agitation, grinding, milling, debarking, and any combination thereof.

In one embodiment, it may be desirable to combine the biomass with a catalyst in the biomass feed system 18 prior to introducing the biomass into the biomass conversion reactor 20. Alternatively, the catalyst may be introduced directly into the biomass conversion reactor 20. The catalyst may be fresh and/or regenerated catalyst. The catalyst can be a heterogeneous cracking catalyst such as, for example, a solid acid, an amorphous silica-alumina, alumina phosphates, or a zeolite. Examples of suitable zeolites include ZSM-5, ZSM-11, ZSM-12, ZSM-18, ZSM-22, ZSM-23, zeolite-L, Mordenite, Beta, Ferrierite, zeolite-Y, or combinations thereof. Additionally or alternatively, the catalyst may comprise a super acid. Examples of suitable super acids include Nafion-H, sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases include layered double hydroxides, mixed metal oxides, hydrotalcite, clays, and combinations thereof. In yet another embodiment, the catalyst can also comprise an alumina, such as alpha-alumina.

In certain embodiments, the catalyst can be an equilibrium catalyst (E-cat) from a fluid catalytic cracking (FCC) unit of an oil refinery. This term refers to catalyst material that has, on average, circulated in the FCC unit for a considerable length of time. The term is used to distinguish fresh catalyst, which has not been exposed to the environment of the FCC unit, and which has much greater catalytic activity than the E-cat. This spent catalyst is a waste product from oil refineries, and as such, is abundantly available at low cost.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 20, they are not considered catalysts.

As shown in FIG. 1, the biomass feed system 18 introduces the biomass feedstock into the biomass conversion reactor 20. In the biomass conversion reactor 20, biomass is subjected to a conversion reaction that produces a biomass-derived liquid. In one embodiment, the biomass-derived liquid is a bio-oil. The reactor 20 can be any system or device capable of converting biomass to a bio-oil. The biomass conversion reactor 20 can be, for example, a fluidized bed reactor, a cyclone reactor, an ablative reactor, or a riser reactor. While in the biomass conversion reactor 20, the biomass feedstock can be subjected to thermochemical conversion or thermo-catalytic conversion in order to produce a biomass-derived liquid.

"Thermochemical conversion" as used herein refers to a non-catalytic conversion process such as, for example, fast pyrolysis, alkylation, isomerization, decarboxylation, or decarbonylation. In certain embodiments, the thermochemical conversion refers to fast pyrolysis processes, which convert all or part of the biomass to bio-oil by heating the biomass in an oxygen-poor or oxygen-free atmosphere. Fast pyrolysis utilizes much shorter residence times than conventional pyrolysis. For example, the residence times of fast pyrolysis can be less than 10, 5, 2, or 1 seconds. Additionally, fast pyrolysis can occur at temperatures of at least 200° C., 300° C., 400° C., or 500° C. and/or not more than 1,000° C., 800° C., 700° C., or 600° C. As used above, the term "oxygen-poor" refers to an atmosphere containing less oxygen than ambient air. In general, the amount of oxygen should be such as to avoid combustion of the biomass material, or vaporized and gaseous products emanating from the biomass material, at the pyrolysis temperature. Preferably, the atmosphere is essentially oxygen-free such that it contains less than about 1 weight percent oxygen. As used herein, "oxygen-free" refers to an atmosphere that is substantially free of molecular oxygen.

"Thermo-catalytic conversion" as used herein refers to a catalytic conversion process, wherein a catalyst is used to help facilitate cracking, alkylation, isomerization, decarboxylation, and/or decarbonylation of the biomass. In certain embodiments, the thermo-catalytic process occurs under fast pyrolysis conditions. Accordingly, in a biomass thermo-catalytic conversion process, a catalyst is used in the reactor 20 to facilitate the conversion of the biomass to bio-oil. As previously discussed, the catalyst can be pre-mixed with the biomass before introduction into the reactor 20 or it can be introduced into the reactor 20 separately.

In one embodiment, the biomass conversion reactor 20 can be a riser reactor with the conversion reaction being biomass thermo-catalytic conversion. As discussed above, the biomass thermo-catalytic conversion should occur in an oxygen-poor or, preferably, oxygen-free atmosphere. In another embodiment, biomass thermo-catalytic conversion is carried out in the presence of an inert gas, such as nitrogen, carbon dioxide, and/or steam. Alternatively, the biomass thermo-catalytic conversion can be carried out in the presence of a reducing gas, such as hydrogen, carbon monoxide, non-condensable gases recycled from the biomass conversion process, or combinations thereof.

Referring again to FIG. 1, the conversion effluent 22 exiting the biomass conversion reactor 20 generally comprises gas, vapors, and solids. As used herein, the vapors produced during the conversion reaction may interchangeably be referred to as "bio-oil," which is the common name for the vapors when condensed into their liquid state. In the case of biomass thermo-catalytic conversion, the solids in the conversion effluent 22 generally comprise particles of char, ash, unconverted portions of biomass, and/or spent catalyst. Because such solids, such as the unconverted biomass and spent catalyst, can contribute to the tendency of the bio-oil to form ash, it is particularly desirable to remove the solids so that the bio-oil is essentially solids-free. In one embodiment, the bio-oil has an ash content (i.e., solids content) of less than about 3000 ppmw, 2000 ppmw, or 1000 ppmw.

As depicted in FIG. 1, the conversion effluent 22 from the biomass conversion reactor 20 can be introduced into a solids separator 24. The solids separator 24 can be any conventional device capable of separating solids from gas and vapors such as, for example, a cyclone separator, a gas filter, or combinations thereof. The solids separator 24 removes a substantial portion of the solids (e.g., spent catalysts, char, and/or heat carrier solids) from the conversion effluent 22. The solid particles 26 recovered in the solids separator 24 can be introduced into a regenerator 28 for regeneration, typically by combustion. After regeneration, at least a portion of the hot regenerated solids can be introduced directly into the biomass conversion reactor 20 via line 30. Alternatively or additionally, at least a portion of the hot regenerated solids can be directed via line 32 to the biomass feed system 18 for combination with the biomass feedstock prior to introduction into the biomass conversion reactor 20.

The substantially solids-free stream 34 exiting the solids separator 24 can then be introduced into a condenser 36. Within the condenser 36, the vapors are condensed or partially condensed into a bio-oil stream 38 and separated from the non-condensable gases. In certain embodiments, the separated and condensed bio-oil can have an organic oxygen content of at least 5, 6, 7, 8, 9, 10, 11, 12, 13, 14, or 15 weight percent. Additionally or alternatively, the separated and condensed bio-oil can have an organic oxygen content of not more than 40, 30, 25, 20, 18, 16, 15, 14, 13, 12, 11, or 10 weight percent. In another embodiment, the separated and condensed bio-oil has a total acid number (TAN) of not more than 50, 40, 30, 20, or 15 mg KOH/g.

In certain embodiments, the separated and condensed bio-oil has a cycloparaffins content of not more than 6, 4, 2, or 1 weight percent. In another embodiment, the separated and condensed bio-oil has a furanics content of at least 2, 4, or 6 weight percent. In yet another embodiment, the separated and condensed bio-oil has a BTX content of at least 5, 10, 15, or 20 and/or not more than 60, 50, or 40 weight percent.

In certain embodiments, the separated and condensed bio-oil has an oxygenated hydrocarbons content of at least 20, 30, or 40 weight percent. Additionally or alternatively, the separated and condensed bio-oil has an oxygenated hydrocarbons content of not more than 80, 70, or 60 weight percent. In another embodiment, the separated and condensed bio-oil has a non-oxygenated hydrocarbons content of at least 20, 30, or 40 weight percent. Additionally or alternatively, the separated and condensed bio-oil has a non-oxygenated hydrocarbons content of not more than 80, 70, or 60 weight percent.

As shown in FIG. 1, the separated non-condensable gases are removed from the condenser 36 as a non-condensable gas stream. The non-condensable gases removed from the condenser 36 may be, optionally, recycled to the biomass conversion reactor 20 for use as a lift gas.

Subsequent to exiting the condenser 36, the bio-oil stream 38 can be combined with a petroleum-derived stream 40 comprising one or more petroleum-derived compositions and, optionally, an additives stream 42 comprising one or more additives. Afterward, the combined streams are introduced into the blending unit 12. While in the blending unit 12, the bio-oil stream 38 is blended with the petroleum-derived stream 40 and, optionally, the additives stream 42 to produce a fungible bio-oil. In certain embodiments, an insoluble residue will form in the newly-produced fungible bio-oil and will be intermixed therein. The blending unit 12 can be any conventional mixer or blending unit commonly known and used in the art that is capable of blending the bio-oil stream 38, the petroleum-derived stream 40, and additives stream 42. In an alternative embodiment, the petroleum-derived stream 40 and the additives stream 42 can be combined with the bio-oil stream 38 in the blending unit 12. In one embodiment, the bio-oil stream 38 does not need to be subjected to hydrotreatment before being combined with the petroleum-derived stream 40 and/or the additives stream 42. The fungible bio-oil and, if formed, the insoluble residue are removed from the blending unit 12 as a mixture stream 44.

In certain embodiments, the petroleum-derived compositions in the petroleum-derived stream 40 and/or the additives in additives stream 42 can be in the form of a liquid. In one embodiment, the petroleum-derived compositions can function as an extractant and cause the formation of an insoluble residue. In such an embodiment, the petroleum-derived composition may be referred to as an "extractant" and the insoluble residue is a concentration of the undesirable reactive species originally found in the bio-oil that have been extracted from the bio-oil.

The petroleum-derived stream 40 can be added at such a rate to the bio-oil stream 38 that the resulting mixture stream 44 comprises at least about 1, 5, 10, 15, 20, or 25 weight percent of at least one petroleum-derived composition. Additionally or alternatively, the mixture stream 44 can comprise not more than about 99, 95, 90, 80, 70, 60, 50, 40, or 30 weight percent of at least one petroleum-derived composition. In certain embodiments, the amount of petroleum-derived compositions to be added to the bio-oil depends on the organic oxygen content of the initial bio-oil. Generally, lower amounts of petroleum-derived compositions are required to dissolve bio-oils with lower organic oxygen contents. In one embodiment, the weight ratio of the initial bio-oil to the petroleum-derived composition in the mixture stream 44 is at least 1:1, 1.5:1, 2:1, 4:1, 6:1, or 8:1 and/or not more than 20:1, 15:1, or 10:1. In another embodiment, the weight ratio of the initial bio-oil to the petroleum-derived composition in the mixture stream 44 is at least 0.01:1, 0.1:1, 0.5:1, or 1:1 and/or not more than 10:1, 5:1, or 2:1.

The petroleum-derived compositions utilized in this invention can comprise any solvent that is capable of dissolving at least a portion of a bio-oil. In certain embodiments, the petroleum-derived compositions can dissolve most, if not all, of the bio-oil. In another embodiment, the petroleum-derived composition is also fully miscible and compatible with conventional refinery streams.

In certain embodiments, the petroleum-derived compositions can comprise a non-polar composition. In another embodiment, the petroleum-derived compositions have an aromatics content of at least about 40, 50, 60, 70, 80, or 90 weight percent. In yet another embodiment, the petroleum-derived compositions comprise hydrocarbon-containing compositions including, but not limited to, toluene, crude oil, light cycle oil, reformate, and combinations thereof. In still yet another embodiment, the petroleum-derived compositions are at least partly derived from at least one refinery stream and/or at least one petrochemical plant stream.

The additives stream 42, optionally, can be added at such a rate to the bio-oil stream 38 that the resulting mixture stream 44 comprises at least about 0.5, 1, 2, 3, or 4 weight percent of one or more additives. Additionally or alternatively, the mixture stream 44 can comprise not more than about 25, 20, 15, 14, 12, or 10 weight percent of one or more additives.

In certain embodiments, the amount of additives to be added to the bio-oil depends on the organic oxygen content of the initial bio-oil and the amount of petroleum-derived compositions used. In one embodiment, no additives are needed when the resulting mixture stream 44 is formed from a low oxygen bio-oil (i.e., an organic oxygen content of less than 15 weight percent) and comprises not more than about 40 weight percent of at least one petroleum-derived composition. In such an embodiment, the petroleum-derived compositions are sufficient by themselves to dissolve most of the bio-oil. In another embodiment, the additives can make up at least about 0.5 weight percent and not more than about 10 weight percent of the resulting mixture stream 44 when it is formed from a low oxygen bio-oil (i.e., an oxygen content of less than 15 weight percent) and comprises more than about 40 weight percent of at least one petroleum-derived composition. In yet another embodiment, the additives can make up at least about 0.5 weight percent and not more than about 10 weight percent of the resulting mixture stream 44 when it is formed from an intermediate oxygen bio-oil (i.e., an oxygen content of more than 15 to less than 18 weight percent) and comprises at least about 10 weight percent and not more than about 90 weight percent of at least one petroleum-derived composition. In still yet another embodiment, the additives can make up at least about 0.5 weight percent and not more than about 10 weight percent of the resulting mixture stream 44 when it is formed from a high oxygen bio-oil (i.e., an oxygen content of 18 to 25 weight percent) and comprises at least about 30 weight percent and not more than about 90 weight percent of at least one petroleum-derived composition.

The additives utilized in this invention can comprise any additive that is compatible with the selected petroleum-derived compositions and capable of causing the formation of an insoluble residue when combined with an initial bio-oil. In one embodiment, the additives are selected from a group consisting of a carboxylate, a benzoate ester, a fatty acid methyl ester (FAME), an alkoxylate, and combinations thereof. In another embodiment, the additives are selected from the group consisting of FAME, a dispersant from the Kemelix™ series, a solubilizer from the Prifer™ series, and combinations thereof. An example of a dispersant from the Kemelix™ series includes Kemelix™ 7475x (Croda, Edison, N.J., USA). An example of a solubilizer from the Prifer™ series includes Prifer™ 6813 (Croda, Edison, N.J., USA). Additional additives include, for example, glycolic acid ethoxylate 4-nonylphenyl ether, glycolic acid ethoxylate 4-tert-butylphenyl ether, glycolic acid ethoxylate lauryl ether, and 1-oleoyl-rac-glycerol. Other commercial examples of possible additives include, but are not limited to, Span™ 20, 40, 60, 65, 80, and 85 (Sigma-Aldrich, St. Louis, Mo., USA); Tween® 20, 21, 60, 61, 65, and 80 (Sigma-Aldrich, St. Louis, Mo., USA); Crodamol™ GTCC (Croda, Edison, N.J., USA); Priolube® 1427, 1435, 1445, 3970, 1562, 3019, 3114, and 3142 (Croda, Edison, N.J., USA); Lanfa™ 2 (Croda, Edison, N.J., USA); Cithrol GMS™ 40 (Croda, Edison, N.J., USA); and Synperonic™ 13 (Croda, Edison, N.J., USA).

Turning back to FIG. 1, the mixture stream 44 is introduced into a separator 14. While in the separator 14, at least a portion of the mixture stream 44 is separated into a fungible bio-oil 46 and, optionally, an insoluble residue 48 if one is formed. The separator 14 can be any conventional separator known in the art that is capable of removing the insoluble residues from the fungible bio-oil. The separator 14 can be, for example, a decanter, a desorber, a fractionator, or a combination thereof.

In one alternative embodiment not depicted in FIG. 1, the blending unit 12 and the separator 14 can comprise the same unit or reactor.

In certain embodiments, at least 80, 85, 90, 95, 98, or 99 weight percent of the compounds originally found in the initial bio-oil are retained in the fungible bio-oil. The fungible bio-oil can have an organic oxygen content of at least about 1, 2, or 3 weight percent and/or not more than 15, 12, 10, 8, 6, or 4 weight percent. Additionally or alternatively, the fungible bio-oil can have a total acid number (TAN) of not more than 30, 20, or 10 mg KOH/g. Due to the low organic oxygen contents and/or low TAN values, the fungible bio-oil is less corrosive and, therefore, can be easier to store or transport. For instance, the fungible bio-oil can be stored for a time period of at least 1, 5, 10, 30, or 60 days without damaging the storage unit. Additionally or alternatively, the fungible bio-oil can be transported over a distance of at least 10, 50, 100, or 500 miles without damaging the transport unit.

In one embodiment, the fungible bio-oil has a cycloparaffins content of not more than 8, 6, 4, 3, 2, 1 or 0.5 weight percent. In another embodiment, the fungible bio-oil has a furanics content of at least 1, 2, or 3 weight percent. In yet another embodiment, the fungible bio-oil has a BTX content of at least 2, 4, 6, or 8 and/or not more than 50, 40, 30, 25, or 20 weight percent. Alternatively, in embodiments where a reformate and/or toluene are used to produce the fungible bio-oil, the fungible bio-oil can have a BTX content of at least 2, 5, 10, 15, or 20 and/or not more than 99, 90, 80, 70, or 60 weight percent.

In certain embodiments, the fungible bio-oil has an oxygenated hydrocarbons content of at least 4, 6, 8, 10, 15, or 20 weight percent. Additionally or alternatively, the fungible bio-oil has an oxygenated hydrocarbons content of not more than 30, 25, or 20 weight percent. In another embodiment, the fungible bio-oil has a non-oxygenated hydrocarbons content of at least 10, 15, 20, or 25 weight percent. Additionally or alternatively, the fungible bio-oil has a non-oxygenated hydrocarbons content of not more than 80, 70, 60, 40, 35, or 30 weight percent. In yet another embodiment, the fungible bio-oil has an aromatics content of at least 30, 40, 60, 70, 80, or 90 weight percent.

In certain embodiments, the fungible bio-oil has a density of at least about 0.70, 0.75, 0.80, or 0.85 g/cc and/or not more than about 1.20, 1.15, 1.10, or 1.05 g/cc. In another embodiment, the fungible bio-oil has a viscosity of about 1, 2, 3, 5, or 10 cP and/or not more than about 100, 90, 80, 60, or 40 cP. In yet another embodiment, the fungible bio-oil composition has an average molecular weight of at least about 200, 225, 250, or 275 amu and/or not more than about 800, 750, 700, or 650 amu.

In certain embodiments, the fungible bio-oil has a mid-boiling point of 150° C., 200° C., or 225° C. and/or not more that 400° C., 350° C., or 325° C. In another embodiment, at least 75, 80, or 90 percent of the fungible bio-oil boils at a temperature of at least 100° C., 150° C., or 180° C. and/or not more than 500° C., 450° C., or 400° C.

In one embodiment, the fungible bio-oil comprises at least about 1, 5, 10, 15, 20, 25, 30, 35, 40, 45, 50, 60, 70, 80, or 90 weight percent of biomass-derived components, at least about 1, 5, 10, 15, 20, 25, 30, 35, 40, 45, 50, 60, 70, 80, or 90 weight percent of petroleum-derived components, and, optionally, at least about 0.5 and not more than about 25 weight percent of one or more additives. The biomass-derived components can include, for example, the bio-oil produced from the biomass conversion described above. Similarly, the petroleum-derived components can be derived from the petroleum-derived compositions described above. In another embodiment, the fungible bio-oil comprises a weight ratio of biomass-derived components to petroleum-derived components of at least 0.01:1, 0.1:1, 0.5:1, or 1:1 and/or not more than 20:1, 10:1, 5:1, or 2:1. In yet another embodiment, the fungible bio-oil comprises a weight ratio of biomass-derived components to petroleum-derived components of at least 1:1, 1.5:1, 2:1, 3:1, 4:1, or 5:1 and/or not more than 20:1, 15:1, or 10:1.

In certain embodiments, at least a portion of the fungible bio-oil can be blended with a petroleum-derived refinery feedstock for subsequent processing in a refinery. In another embodiment, at least a portion of the fungible bio-oil can be combined with a petrochemical plant feedstock for subsequent processing in a petrochemical plant. In yet another embodiment, at least a portion of the fungible bio-oil can be subjected to hydrocracking and/or hydrotreatment.

In embodiments where an insoluble residue is formed, the amount of insoluble residue 48 separated from the mixture stream 44 is at least about 1, 2, 4, or 8 and/or not more than 30, 20, 15, or 10 percent of the total weight of the initial bio-oil 38 fed to the blending unit 12. In another embodiment, at least 0.1, 1, 2, 3, 4, or 5 and/or not more than 30, 25, 20, 15, or 10 weight percent of the mixture stream 44 is separated into the insoluble residue 48. The insoluble residue 48 may be removed from the mixture stream 44 in the form of a solid and/or sludge. In one embodiment, the insoluble residue 48 is removed from the mixture stream 44 in the form of a solid precipitate.

The removed insoluble residue comprises many of the undesirable compounds originally present in the initial bio-oil that negatively impacted the bio-oil's miscibility with conventional refinery feedstocks. In one embodiment, the insoluble residue has a higher organic oxygen content relative to the organic oxygen content of the initial bio-oil. In such an embodiment, the weight ratio of the organic oxygen content of the insoluble residue to the organic oxygen content of the initial bio-oil is at least 1.01:1, 1.05:1, 1.1:1, 1.15:1, or 1.2:1. In another embodiment, the insoluble residue has an organic oxygen content that is at least 12, 16, 24, or 28 weight percent and/or not more than 50, 40 or 30 weight percent.

In certain embodiments, the insoluble residue can comprise one or more polar compounds. In one embodiment, at least 70, 80, 90, or 95 percent of the polar compounds exhibit a weight average molecular weight of at least 300, 350, 400, 425, or 450 amu and/or not more than about 600, 550, or 500 amu.

In certain embodiments, the insoluble residue has a viscosity of at least about 25, 30, 40, or 50 cP and/or not more than about 10,000, 8,000, 6,000, or 5,000 cP. In one embodiment, the insoluble residue has a density of at least about 1.0, 1.05, 1.1, or 1.15 and/or not more than about 1.5, 1.4, 1.35, or 1.3 g/cc. In another embodiment, the insoluble residue has an average molecular weight of at least 100, 150, 200, or 250 amu and/or not more than 1,000, 800, 700, or 650 amu.

In certain embodiments, the insoluble residue has a density that is at least about 1.1, 5, or 10 and/or not more than 100, 80, or 50 times greater than the density of the initial bio-oil. In another embodiment, the insoluble residue has a viscosity that is at least about 1.1, 5, or 10 and/or not more than 100, 80, or 50 times greater than the viscosity of the initial bio-oil.

EXAMPLES

This invention can be further illustrated by the following examples of preferred embodiments thereof, although it will be understood that these examples are included merely for purposes of illustration and are not intended to limit the scope of the invention unless otherwise specifically indicated.

Example 1

In this example, the miscibility of a bio-oil and toluene was observed. In particular, this example focused on how much toluene was required to solubilize the bio-oil and produce the insoluble residue, which contains the undesirable reactive species from the bio-oil. The bio-oil was Re-Crude™ from KiOR, Pasadena, Tex., which comprises an organic oxygen content of about 10 weight percent. Different ratios of toluene to bio-oil were utilized in order to observe at what ratio the bio-oil and toluene were most miscible. Miscibility was calculated by measuring how much insoluble residue was formed overnight at each ratio. The amount of insoluble residue formed was measured relative to the total weight of the bio-oil, toluene, and formed insoluble residue. Generally, higher amounts of formed insoluble residue indicated a poorer miscibility between the toluene and bio-oil. The results of these tests are summarized in TABLE 1.

TABLE 1

| Ratio (Toluene:Bio-oil) | % of Insoluble Residue |
| --- | --- |
| 10:1 | 22 |
| 7:5 | 13 |
| 1:1 | 9 |
| 1:10 | 0 |

As seen in TABLE 1, toluene seems to be somewhat miscible with the bio-oil, but miscibility decreased as larger amounts of toluene were used relative to the bio-oil. This is illustrated in the 10:1 and 7:5 ratios, which yielded large amounts of insoluble residue, thereby indicating a poorer miscibility between the toluene and the bio-oil.

Example 2

In this example, the miscibility-enhancing capabilities of different additives were assessed in order to maximize the miscibility of bio-oil with toluene and to minimize the amount of formed insoluble residue. The bio-oil was Re-Crude™ from KiOR, Pasadena, Tex., which comprises an organic oxygen content of about 14 weight percent. The amount of additive was based on the total weight of the combined mixture of bio-oil, toluene, and additives. The amount of formed insoluble residue was measured relative to the total weight of the bio-oil, toluene, additives, and formed insoluble residue. Additives that were used to produce and test different HLB values were from the Span™ and Tween™ series from Croda, Yorkshire, UK. Additional additives that were tested included fatty acid methyl esters (FAME); Kemelix™ 7475x from Croda, Yorkshire, UK; and Prifer™ 6813 from Croda, Yorkshire, UK. The results of this example are summarized in TABLE 2.

TABLE 2

| Additive | Ratio (Toluene:Bio-oil) | Weight % of Additive | % of Insoluble Residue |
|---|---|---|---|
| HLB 2 | 7:5 | 4 | 12 |
| HLB 4 | 7:5 | 4 | 11 |
| HLB 6 | 7:5 | 4 | 11 |
| HLB 8 | 7:5 | 4 | 11 |
| HLB 10 | 7:5 | 4 | 11 |
| HLB 12 | 7:5 | 4 | 11 |
| HLB 14 | 7:5 | 4 | 11 |
| HLB 16 | 7:5 | 4 | 13 |
| FAME | 7:4.3 | 6 | 12 |
| FAME | 7:4.5 | 4 | 12 |
| FAME | 7:4.7 | 2 | 12 |
| Kemelix ™ 7475x | 7:5 | 4 | 6 |
| Prifer ™ 6813 | 7:5 | 4 | 7 |
| Prifer ™ 6813 | 10:1 | 0.9 | 7 |
| Prifer ™ 6813 | 10:1 | 3 | 7 |

As shown in TABLE 2, many of the additives were not effective in decreasing the amount of insoluble residue formed. Only Kemelix™ 7475x and Prifer™ 6813 were effective at decreasing the amount of insoluble residue formed. Kemelix™ 7475x was an effective additive as it reduced the amount of insoluble residue from 13% to 6% for the 7:5 ratio. Prifer™ 6813 was also an effective additive as it reduced the amount of insoluble residues from 13% to 7% for the 7:5 ratio and from 22% to 7% for the 10:1 ratio.

Example 3

In this example, the miscibility of a bio-oil and LCO was observed. In particular, this example focused on how much LCO was required to solubilize two bio-oil samples of different quality without producing any insoluble residue. The bio-oils were Re-Crude™ from KiOR, Pasadena, Tex., which comprises an organic oxygen content of about 10 to 15 weight percent. Different ratios of LCO to bio-oil were utilized in order to observe at what ratio the bio-oil and LCO were most miscible. Generally, lower amounts of LCO indicated a poorer miscibility between the LCO and bio-oil. The results of these tests are summarized in TABLE 3.

TABLE 3

| Ratio (LCO:Bio-oil) | % of Oxygen in Bio-oil |
|---|---|
| 3.5:6.5 | 10 |
| 2:8 | 15 |

Example 4

In this example, the miscibility-enhancing capabilities of different additives were assessed in order to maximize the miscibility of bio-oil with light cycle oil (LCO) and to minimize the amount of formed insoluble residue. The bio-oil was Re-Crude™ from KiOR, Pasadena, Tex. The amount of additive was based on the total weight of the combined mixture of bio-oil, LCO, and additives. The amount of insoluble residues formed was measured relative to the total weight of the bio-oil, LCO, additives, and formed insoluble residue. The additives tested included those from Example 2. The results of this example are summarized in TABLE 4.

TABLE 4

| Additive | Ratio (LCO:Bio-oil) | % FAME | % Prifer ™ 6813 | % Kemelix ™ 7475x | % Total Additive | % of Insoluble Residue |
|---|---|---|---|---|---|---|
| None | 7:5 | 0 | 0 | 0 | 0 | 34 |
| Kemelix ™ 7475x | 7:5 | 0 | 0 | 4 | 4 | 31 |
| Prifer ™ 6813 | 7:5 | 0 | 4 | 0 | 4 | 27 |
| FAME + Prifer ™ 6813 | 7:4.3 | 6 | 4 | 0 | 10 | 18 |
| FAME + Prifer ™ 6813 | 7:4.5 | 4 | 4 | 0 | 8 | 22 |
| FAME + Prifer ™ 6813 | 7:4.7 | 2 | 4 | 0 | 6 | 24 |

As shown in TABLE 4, all of the additives were effective at decreasing the amount of insoluble residue formed, especially the combination of FAME and Prifer™ 6813.

Example 5

In this example, the miscibility-enhancing capabilities of different additives were assessed in order to maximize the miscibility of bio-oil with light cycle oil (LCO) and to minimize the amount of formed insoluble residue. The bio-oil was Re-Crude™ from KiOR, Pasadena, Tex. The amount of additive added was based on the total weight of the combined mixture of bio-oil, LCO, and additives. The amount of insoluble residue formed was measured relative to the total weight of the bio-oil, LCO, additives, and formed insoluble residue. The additives tested included those from Example 2. The results of this example are summarized in TABLES 5A-5D and depicted in FIG. 2.

TABLE 5A

NO ADDITIVES

| % Bio-oil | LCO (g) | Bio-oil (g) | % Total Additive | % of Insoluble Residue |
|---|---|---|---|---|
| 0 | 20 | 0 | 0 | 0 |
| 10 | 18 | 2 | 0 | 7 |
| 20 | 16 | 4 | 0 | 14 |
| 30 | 14 | 6 | 0 | 21 |
| 40 | 12 | 8 | 0 | 28 |
| 50 | 10 | 10 | 0 | 42 |
| 60 | 8 | 12 | 0 | 44 |
| 70 | 6 | 14 | 0 | 4 |
| 80 | 4 | 16 | 0 | 4 |
| 90 | 2 | 18 | 0 | 1 |
| 100 | 0 | 20 | 0 | 1 |

TABLE 5B

4% PRIFER

| % Bio-oil | LCO (g) | Bio-oil (g) | Prifer™ 6813 (g) | % Prifer™ 6813 | % Total Additive | % of Insoluble Residue |
|---|---|---|---|---|---|---|
| 0 | 19.2 | 0 | 0.8 | 4 | 4 | 0.6 |
| 10 | 17.2 | 2 | 0.8 | 4 | 4 | 6.5 |
| 20 | 15.2 | 4 | 0.8 | 4 | 4 | 12.5 |
| 30 | 13.2 | 6 | 0.8 | 4 | 4 | 19.3 |
| 40 | 11.2 | 8 | 0.8 | 4 | 4 | 25.3 |
| 50 | 9.2 | 10 | 0.8 | 4 | 4 | 29.7 |
| 60 | 7.2 | 12 | 0.8 | 4 | 4 | 4.4 |
| 70 | 5.2 | 14 | 0.8 | 4 | 4 | 0.7 |
| 80 | 3.2 | 16 | 0.8 | 4 | 4 | 1.0 |
| 90 | 1.2 | 18 | 0.8 | 4 | 4 | 3.7 |
| 96 | 0 | 19.2 | 0.8 | 4 | 4 | 0.6 |

TABLE 5C

6% FAME

| % Bio-oil | LCO (g) | Bio-oil (g) | FAME (g) | % FAME | % Total Additive | % of Insoluble Residue |
|---|---|---|---|---|---|---|
| 0 | 18.8 | 0 | 1.2 | 6 | 6 | 0.8 |
| 10 | 16.8 | 2 | 1.2 | 6 | 6 | 4.6 |
| 20 | 14.8 | 4 | 1.2 | 6 | 6 | 13.4 |
| 30 | 12.8 | 6 | 1.2 | 6 | 6 | 18.1 |
| 40 | 10.8 | 8 | 1.2 | 6 | 6 | 22.3 |
| 50 | 8.8 | 10 | 1.2 | 6 | 6 | 29.7 |
| 60 | 6.8 | 12 | 1.2 | 6 | 6 | 11.6 |
| 70 | 4.8 | 14 | 1.2 | 6 | 6 | 0.9 |
| 80 | 2.8 | 16 | 1.2 | 6 | 6 | 2.5 |
| 90 | 0.8 | 18 | 1.2 | 6 | 6 | 0.8 |
| 94 | 0 | 18.8 | 1.2 | 6 | 6 | 0.8 |

TABLE 5D

6% FAME AND 4% PRIFER

| % Bio-oil | LCO (g) | Bio-oil (g) | FAME (g) | Prifer™ 6813 (g) | % FAME | % Prifer™ 6813 | % Total Additive | % of Insoluble Residue |
|---|---|---|---|---|---|---|---|---|
| 0 | 18 | 0 | 1.2 | 0.8 | 6 | 4 | 10 | 0.8 |
| 10 | 16 | 2 | 1.2 | 0.8 | 6 | 4 | 10 | 4.6 |
| 20 | 14 | 4 | 1.2 | 0.8 | 6 | 4 | 10 | 13.4 |
| 30 | 12 | 6 | 1.2 | 0.8 | 6 | 4 | 10 | 18.1 |
| 40 | 10 | 8 | 1.2 | 0.8 | 6 | 4 | 10 | 22.3 |
| 50 | 8 | 10 | 1.2 | 0.8 | 6 | 4 | 10 | 29.7 |
| 60 | 6 | 12 | 1.2 | 0.8 | 6 | 4 | 10 | 11.6 |
| 70 | 4 | 14 | 1.2 | 0.8 | 6 | 4 | 10 | 0.9 |
| 80 | 2 | 16 | 1.2 | 0.8 | 6 | 4 | 10 | 2.5 |
| 90 | 0 | 18 | 1.2 | 0.8 | 6 | 4 | 10 | 0.8 |

Figure 2:
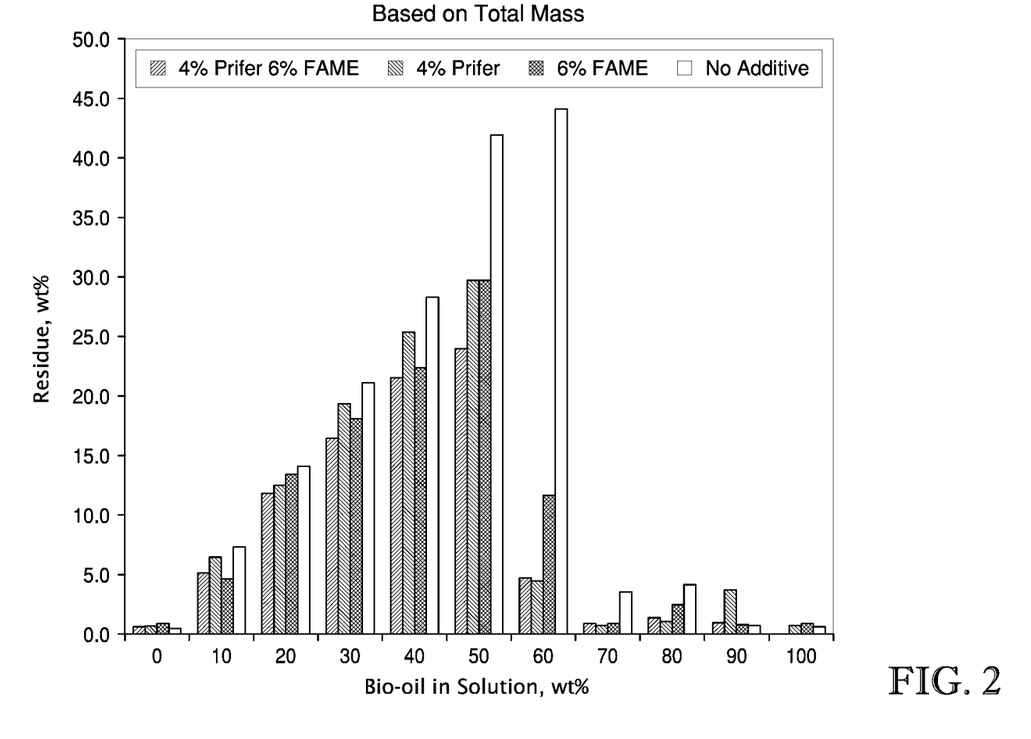
FIG. 2 is a chart depicting the miscibility-enhancing capabilities of FAME and Prifer™ 6813.

As shown in TABLES 5A-5D and in FIG. 2, the use of additives consistently reduced the amount of insoluble residue formed at most bio-oil to LCO ratios.

Example 6

Figure 3:
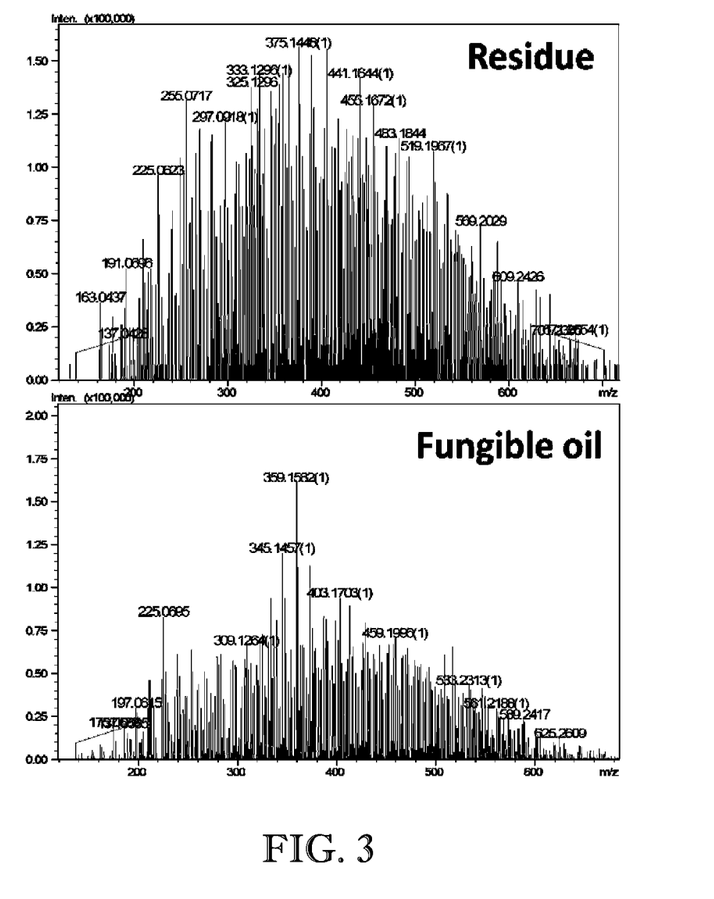
FIG. 3 is a chart depicting the average molecular weights of a fungible bio-oil and a removed residue according to one embodiment of the present invention.

In this example, the molecular weights of the fungible bio-oil and the insoluble residue were measured. A 10 g sample of bio-oil having an organic oxygen content of about 15 weight percent was mixed with 90 g of toluene. A fungible bio-oil containing more than 80% of the original bio-oil and a recovered residue containing less than 20% of the original bio-oil were produced and examined by Mass Spectrometry. FIG. 3 shows the molecular weight distribution for the removed residue and fungible bio-oil, respectively. The average molecular weight of the fungible bio-oil was about 280 amu, while the average molecular weight of the removed residue was about 360 amu.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A process for producing a fungible bio-oil, said process comprising:
   (a) subjecting a lignocellulosic material to a thermo-catalytic conversion process to thereby produce a bio-oil; and
   (b) combining said bio-oil having an organic oxygen content of not more than 15 weight percent with a petroleum-derived composition to produce said fungible bio-oil, wherein the weight ratio of said bio-oil to said petroleum-derived composition in said fungible bio-oil is at least 1:1 and not more than 20:1, wherein said bio-oil has not been subjected to hydrotreatment prior to said combining.

2. The process of claim 1 wherein the weight ratio of said bio-oil to said petroleum-derived composition in said fungible bio-oil is at least 2:1.

3. The process of claim 1 wherein said petroleum-derived composition is non-polar, wherein said petroleum-derived composition has an aromatics content of at least 40 weight percent.

4. The process of claim 1 wherein said petroleum-derived composition comprises at least one stream selected from the group consisting of toluene, crude oil, light cycle oil, reformate, and combinations thereof.

5. The process of claim 1 wherein said fungible bio-oil has a cycloparaffins content of not more than 8 weight percent, a furanics content of at least 2 weight percent, and a BTX content at least 5 weight percent.

6. The process of claim 1 wherein said bio-oil has an oxygenated hydrocarbons content of at least 20 weight percent and not more than 80 weight percent, wherein said bio-oil has an non-oxygenated hydrocarbons content of at least 20 weight percent and not more than 80 weight percent.

7. The process of claim 1 wherein said fungible bio-oil has a mid-boiling point of at least 150° C. and not more than 400° C.

8. The process of claim 1 further comprising combining at least a portion of said fungible bio-oil with a petroleum-derived feedstock.

9. The process of claim 1 further comprising hydrotreating or hydrocracking at least a portion of said fungible bio-oil.

10. The process of claim 1 further comprising storing said fungible bio-oil for a time period of at least 30 days or transporting said fungible bio-oil over a distance of at least 50 miles.

11. A process for producing a fungible bio-oil, said process comprising:
    (a) subjecting a lignocellulosic material to a thermo-catalytic conversion process to thereby produce a bio-oil;
    (b) combining said bio-oil and a non-polar extractant to produce a mixture, wherein said extractant causes the formation of an insoluble residue in said mixture, wherein said bio-oil has not been subjected to hydrotreatment prior to said combining; and
    (c) removing at least a portion of said insoluble residue from said mixture to thereby produce a fungible bio-oil and a removed residue.

12. The process of claim 11 wherein step (a) includes combining an additive with said non-polar extractant and said bio-oil to produce said mixture, wherein said mixture comprises at least 0.5 weight percent and not more than 20 weight percent of said additive.

13. The process of claim 12 wherein said additive is selected from the group consisting of a carboxylate, a benzoate ester, a fatty acid methyl ester (FAME), an alkoxylate, and mixtures thereof.

14. The process of claim 11 wherein the weight ratio of the oxygen content of said removed residue to the oxygen content of said bio-oil is at least 1.01:1, wherein said removed residue has an oxygen content that is at least 12 weight percent and not more than 50 weight percent.

15. The process of claim 11 wherein said removed residue has an average molecular weight of at least 100 amu and not more than 1,000 amu.

16. The process of claim 11 wherein at least 80 weight percent of said bio-oil is retained in said fungible bio-oil.

17. The process of claim 11 wherein said mixture comprises at least 30 weight percent of said non-polar extractant.

18. The process of claim 11 wherein the amount of said removed residue produced in step (b) is at least 1 and not more than 30 percent of the total weight of said bio-oil employed in step (a).

19. The process of claim 11 wherein said bio-oil has an organic oxygen content not more than 25 weight percent.

20. The process of claim 11 wherein said non-polar extractant has an aromatics content of at least 40 weight percent.

21. The process of claim 11 wherein said non-polar extractant comprises one or more hydrocarbon streams selected from the group consisting of toluene, crude oil, light cycle oil, reformate, and combinations thereof.

22. A fungible bio-oil comprising: a bio-oil and petroleum-derived components, wherein the weight ratio of said bio-oil to said petroleum-derived components is at least 1:1 and not more than 20:1, wherein said fungible bio-oil composition has an organic oxygen content of not more than 15 weight percent, wherein said bio-oil is derived from a thermo-catalytic conversion process, wherein said bio-oil has an organic oxygen content of not more than 15 weight percent, wherein said bio-oil has not been subjected to hydrotreatment.

23. The fungible bio-oil of claim 22 wherein said fungible bio-oil has a cycloparaffins content of not more than 8 weight percent, a furanics content of at least 1 weight percent, and a BTX content at least 2 and not more than 50 weight percent.

24. The fungible bio-oil of claim 22 wherein said fungible bio-oil has an oxygenated hydrocarbons content of at least 10 weight percent and not more than 40 weight percent, wherein said fungible bio-oil has a non-oxygenated hydrocarbons content of at least 10 weight percent and not more than 40 weight percent.

25. The fungible bio-oil of claim 22 wherein said fungible bio-oil has a mid-boiling point of at least 150° C. and not more than 400° C.

26. The fungible bio-oil of claim 22 wherein said fungible bio-oil has a density of at least 0.70 glee and not more than 1.20 g/cc, a viscosity of at least 1 cP and not more than 100 cP, and an average molecular weight of at least 200 amu and not more than 800 amu.

27. The fungible bio-oil of claim 22 wherein said fungible bio-oil has an aromatics content of at least 40 weight percent.

28. The fungible bio-oil of claim 22 wherein said petroleum-derived components originate from at least one refinery stream or at least one petrochemical plant stream.

29. The fungible bio-oil of claim 22 wherein said petroleum-derived components originate from at least one stream selected from the group consisting of toluene, crude oil, light cycle oil, reformate, and combinations thereof.

30. A fungible bio-oil comprising: a bio-oil, petroleum-derived components, and at least 0.5 and not more than 25 weight percent of one or more additives, wherein said additive comprises a carboxylate, a benzoate ester, a fatty acid methyl ester (FAME), an alkoxylate, and mixtures thereof, wherein the weight ratio of said bio-oil to said petroleum-derived components in said fungible bio-oil is at least 0.01:1 and not more than 10:1, wherein said bio-oil is derived from a thermo-catalytic conversion process.

31. The fungible bio-oil of claim 30 wherein said fungible bio-oil has a density of at least 0.70 g/cc and not more than 1.20 g/cc, a viscosity of at least 1 cP and not more than 100 cP, and an average molecular weight of at least 250 amu and not more than 1,000 amu.

32. The fungible bio-oil of claim 30 wherein at least 75 weight percent of said fungible bio-oil boils at a temperature of at least 100° C. and not more than 500° C.

33. The fungible bio-oil of claim 30 wherein said fungible bio-oil has an organic oxygen content of not more than 15 weight percent and a total acid number (TAN) of not more than 30 mg KOH/g.

34. The fungible bio-oil of claim 30 wherein said bio-oil has not been subjected to hydrotreatment.

35. The fungible bio-oil of claim 30 wherein said petroleum-derived components originate from at least one refinery stream or at least one petrochemical plant stream.

36. The fungible bio-oil of claim 30 wherein said petroleum-derived components originate from at least one stream selected from the group consisting of toluene, crude oil, light cycle oil, reformate, and combinations thereof.

* * * * *